United States Patent
Carredano et al.

(10) Patent No.: US 10,729,990 B2
(45) Date of Patent: Aug. 4, 2020

(54) METHOD FOR PREDICTING THE DYNAMIC PH RANGE OF A BUFFER

(71) Applicant: GE Healthcare Bio-Sciences AB, Uppsala (SE)

(72) Inventors: Enrique Napoleon Carredano, Uppsala (SE); Elenor Strandberg, Sigtuna (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 617 days.

(21) Appl. No.: 15/519,232

(22) PCT Filed: Oct. 26, 2015

(86) PCT No.: PCT/EP2015/074736
§ 371 (c)(1),
(2) Date: Apr. 14, 2017

(87) PCT Pub. No.: WO2016/066579
PCT Pub. Date: May 6, 2016

(65) Prior Publication Data
US 2017/0232363 A1    Aug. 17, 2017

(30) Foreign Application Priority Data
Oct. 30, 2014   (SE) ..................... 1451297

(51) Int. Cl.
*G05D 21/00*   (2006.01)
*B01D 15/16*   (2006.01)
(Continued)

(52) U.S. Cl.
CPC ............ *B01D 15/166* (2013.01); *B01F 3/088* (2013.01); *G01N 30/34* (2013.01); *G05D 21/02* (2013.01); *B01F 2215/0037* (2013.01)

(58) Field of Classification Search
USPC ........ 702/85, 100, 50, 57, 30, 31, 90; 700/78
See application file for complete search history.

(56) References Cited

U.S. PATENT DOCUMENTS

| | | |
|---|---|---|
| 3,686,118 A | 8/1972 | Benson |
| 6,221,250 B1 * | 4/2001 | Stafstrom .............. G01N 30/34 |
| | | 210/101 |

(Continued)

FOREIGN PATENT DOCUMENTS

| | | |
|---|---|---|
| EP | 2745902 A1 | 6/2014 |
| WO | 2008/017899 A2 | 2/2008 |
| WO | 2009/131524 A1 | 10/2009 |

OTHER PUBLICATIONS

Beynon, "Buffer Calculator", 2008, retrieved from https:..www.liverpool.ac.uk/pfg/tools/bufferCalc/buffer.html.
(Continued)

*Primary Examiner* — Dean Kwak
(74) *Attorney, Agent, or Firm* — Eversheds Sutherland (US) LLP

(57) ABSTRACT

The invention discloses a method for predicting the pH error during mixing of an aqueous buffer comprising at least one weak acid species and/or at least one weak base species, which comprises the steps of:
  a) selecting a start composition of the buffer, giving start values for pH and/or buffer concentration;
  b) calculating the concentrations of all ionic species present in the buffer at a specified pH value from the total composition of the buffer and available dissociation constants;
  c) calculating the contribution of each of said ionic species to a total pH variance from the specified pH value, the buffer concentration, the calculated concentrations of the ionic species and variances in amounts of buffer components;

(Continued)

d) calculating the pH variance, and;
e) setting the variance or the square root of the pH variance as the pH error.

4 Claims, 10 Drawing Sheets

(51) Int. Cl.
*G01N 30/34* (2006.01)
*G05D 21/02* (2006.01)
*B01F 3/08* (2006.01)

(56) References Cited

U.S. PATENT DOCUMENTS

2004/0219064 A1  11/2004  Raghuraman et al.
2011/0039712 A1  2/2011  Bjorkesten et al.

OTHER PUBLICATIONS

International Search Report and Written Opinion regarding International Application No. PCT/EP2015/074736, dated Feb. 17, 2016, 12 pages.
International-Type Search Report regarding SE Application No. 1451297-4, dated May 8, 2015, 5 pages.

\* cited by examiner

METHOD FOR PREDICTING THE DYNAMIC PH RANGE OF A BUFFER

CROSS-REFERENCE TO RELATED APPLICATIONS

This application is a filing under 35 U.S.C. 371 of international application number PCT/EP2015/074736, filed Oct. 26, 2015, which claims priority to SE application number 1451297-4, filed Oct. 30, 2014, the entire disclosures of each of which are hereby incorporated by reference in their entireties.

TECHNICAL FIELD OF THE INVENTION

The present invention relates to preparation of buffers and in particular to a method of predicting pH errors for buffers. The invention also relates to computer programs and mixing systems useful for preparation of buffers of known pH accuracies.

BACKGROUND OF THE INVENTION

A buffer solution is typically an aqueous solution comprising a mixture of a weak acid and its conjugate base, or a weak base and its conjugate acid, and has the property that the pH of the solution changes very little when a small amount of strong acid or base is added to it. Buffer solutions are therefore used as a means of keeping pH at a nearly constant value in a wide variety of chemical applications, including e.g. chromatography, filtration, etc. In general, a buffer solution may be made up of more than one weak acid and its conjugate base. For instance, a wider buffer region may be created by mixing two buffering agents with overlapping individual buffer regions.

A buffer solution having a desired pH, and optionally also ionic strength, may be prepared by calculating the necessary amounts of the ingredients of the buffer and mixing them. While it is often necessary to solve several different equations for calculating the pH of a relatively simple mixture of a weak acid (or base) and a strong base (or acid) depending on their relative concentrations, there is commercial software available for performing such calculations. For many applications, it would be desirable to also be able to predict the expected error in the pH value of the buffer to be prepared with respect to variation in the amounts of the buffer components and to the presence of contaminants. Usually different types of "rules of thumb" are applied for instance +/−1.0 or 0.5 pH units from the thermodynamic $pK_a$ value. However these rules of thumb are only gross approximations and do not take into consideration the buffer concentration whereas it is well known that the buffer concentration is very important factor determining the accuracy of a buffer. A better alternative is to use, the calculated buffer capacity defined as the calculated number of moles of strong acid or base that give rise to a change in one pH unit per unit volume of solution as guidance to determine a valid pH interval. As opposed to the named "rules of thumb" the buffer capacity takes into consideration the buffer concentration. Furthermore, calculations of buffer capacity can be made even taking into consideration the shifts in the $pK_a$ values due to ionic activity (US 2011/0039712). However it is usually not clear which value of the buffer capacity to use as a threshold to decide if the buffer is accurate enough. Another disadvantage of using only the buffer capacity is that it does not take into consideration the incoming error of the amounts of buffer components, e.g. due to metering pump inaccuracies. Yet another disadvantage of the buffer capacity is that its calculation generally does not take into consideration the solubility limits of the buffer. On the contrary buffer capacity calculations usually suggest only a lower limit of the buffer concentration and predict smaller errors at higher buffer concentrations. In practice however, increasing the buffer concentration without knowledge of the buffer solubility limits may lead to precipitation when the solubility limit of the least soluble buffer component is exceeded. In general, due to the complex nature of buffers solutions, being combinations of strong electrolytes like salts and strong acids or bases that dissociate completely and weak electrolytes like buffer substances that ionize partially, reliable calculations of pH intervals of a buffer at which to expect a pH error within a beforehand decided value has so far not been possible and to our knowledge previously not been described before.

SUMMARY OF THE INVENTION

One aspect of the invention is to provide a method of reliably predicting pH errors or pH accuracy ranges for buffers. This is achieved with a method as defined in the claims.

One advantage is that the method allows predictions also in the presence of high salt concentrations which are commonly used in buffers for e.g. bioprocess separations. Further advantages are that the activities of the ions, the buffer concentration and the errors of the amounts of incoming components are taken into account and that the method is easily performed in a computer. A further advantage is that the method allows determination of the interval or intervals at which the predicted error in the pH does not exceed a limit decided ahead given a pre-specified value of the buffer concentration and pre-specified values of the accuracy of the incoming buffer components at different flow rates. Also, it allows determination of the minimum concentration limit at which a beforehand set pH accuracy is achieved, where the accuracy can be described in terms of error bars or confidence intervals at different σ levels. Yet further, the method can automatically provide a user with information and suggestions regarding the following: buffer system, mixtures or combination of buffer systems, buffer concentration ranges, pH range, pump performance and flow rates that are necessary in order to achieve a pH accuracy decided in advance.

A second aspect of the invention is to provide a computer program for prediction of pH errors or pH accuracy ranges. This is achieved with a program as defined in the claims.

A third aspect of the invention is to provide a mixing system for preparation of buffers of known pH accuracy. This is achieved with a system as defined in the claims.

A fourth aspect of the invention is to provide a use of pH error predictions for controlling a buffer formulation or in-line dilution system. This is achieved with a use as defined in the claims.

Further suitable embodiments of the invention are described in the dependent claims.

DRAWINGS

Figure 4:
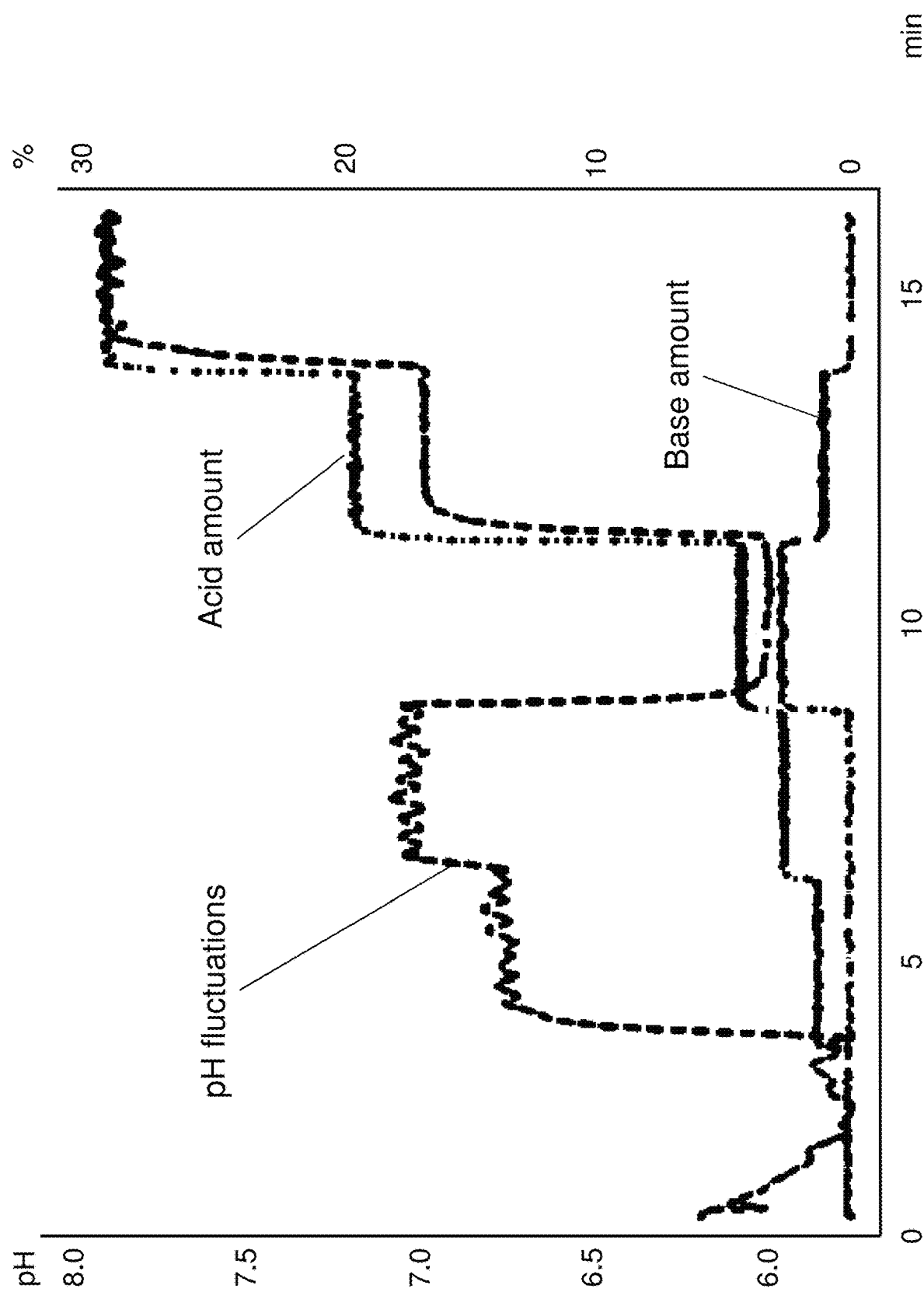

FIG. 4 shows in-line fluctuation in pH for different concentrations and pH at total flow 400 L/h. One line shows pH fluctuations. The two other lines show the amount of acid and base in percent of total flow. The first three steps are 10 mM phosphate buffers, the last three are 100 mM phosphate buffers.

Figure 5:
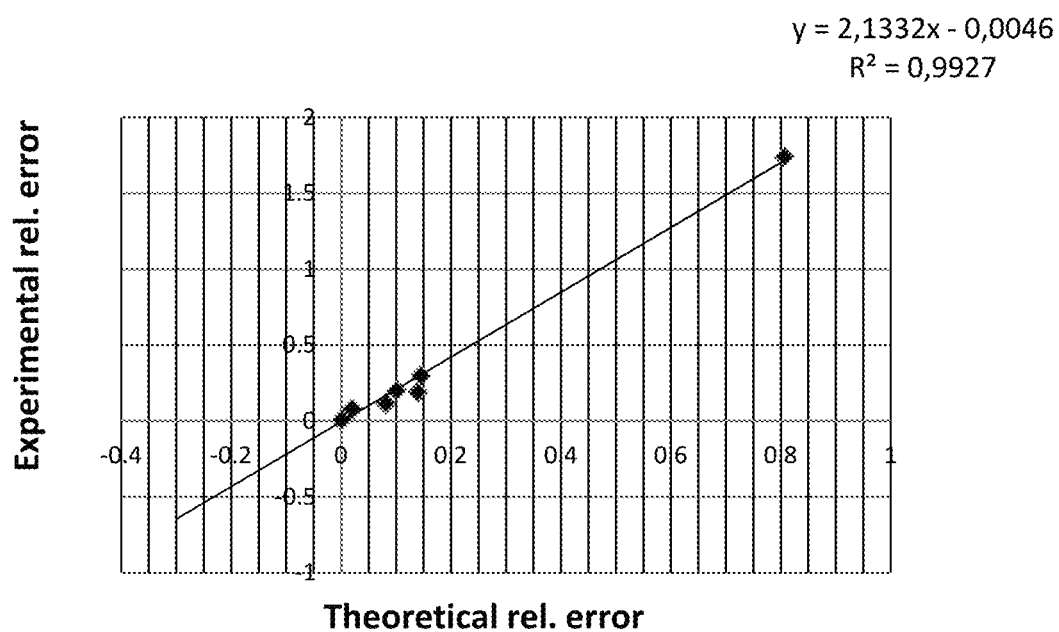

FIG. 5 shows experimental relative errors vs. theoretical relative errors.

Figure 6:
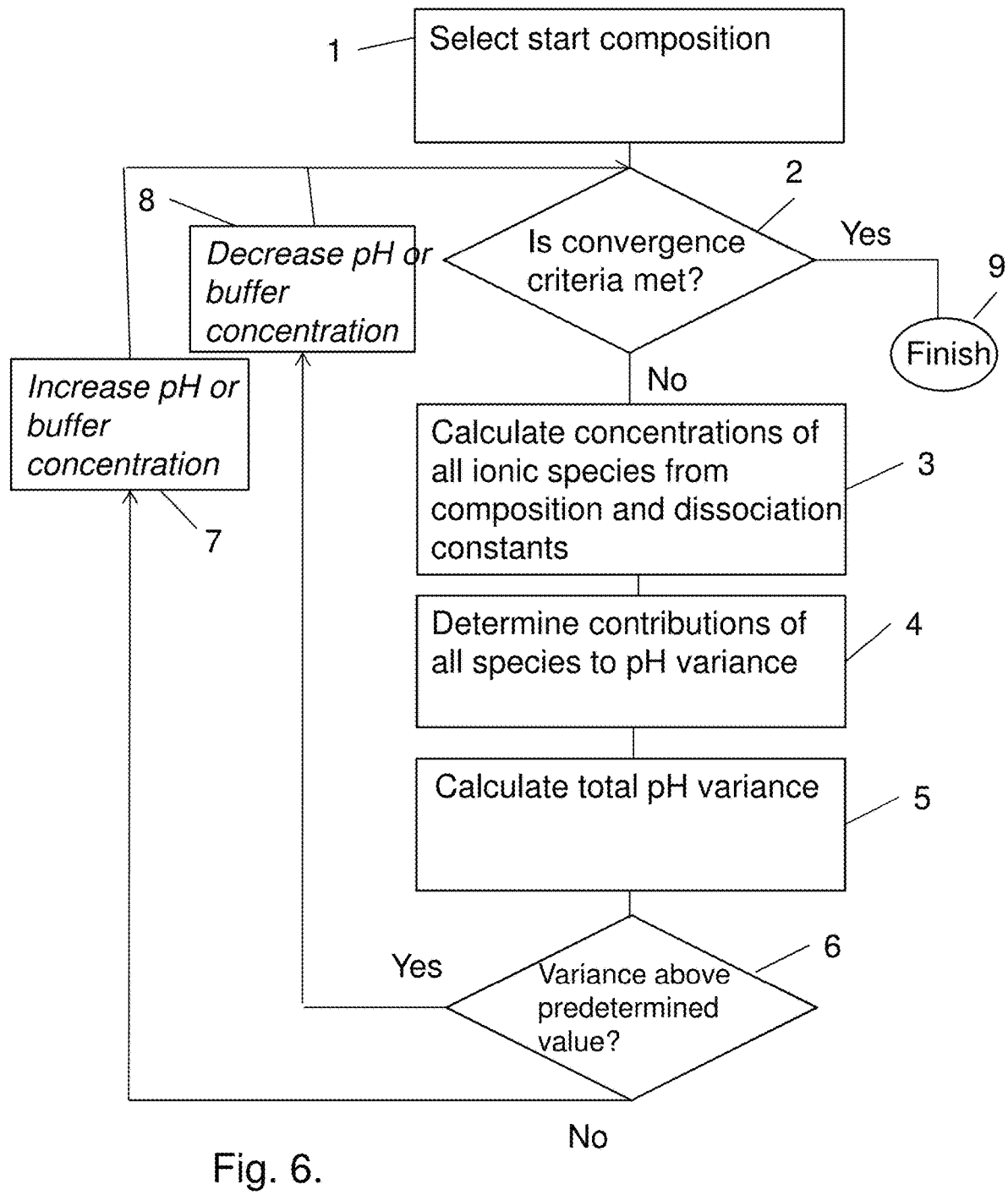

FIG. 6 is a flow diagram of the method for determining the pH error.

Figure 7:
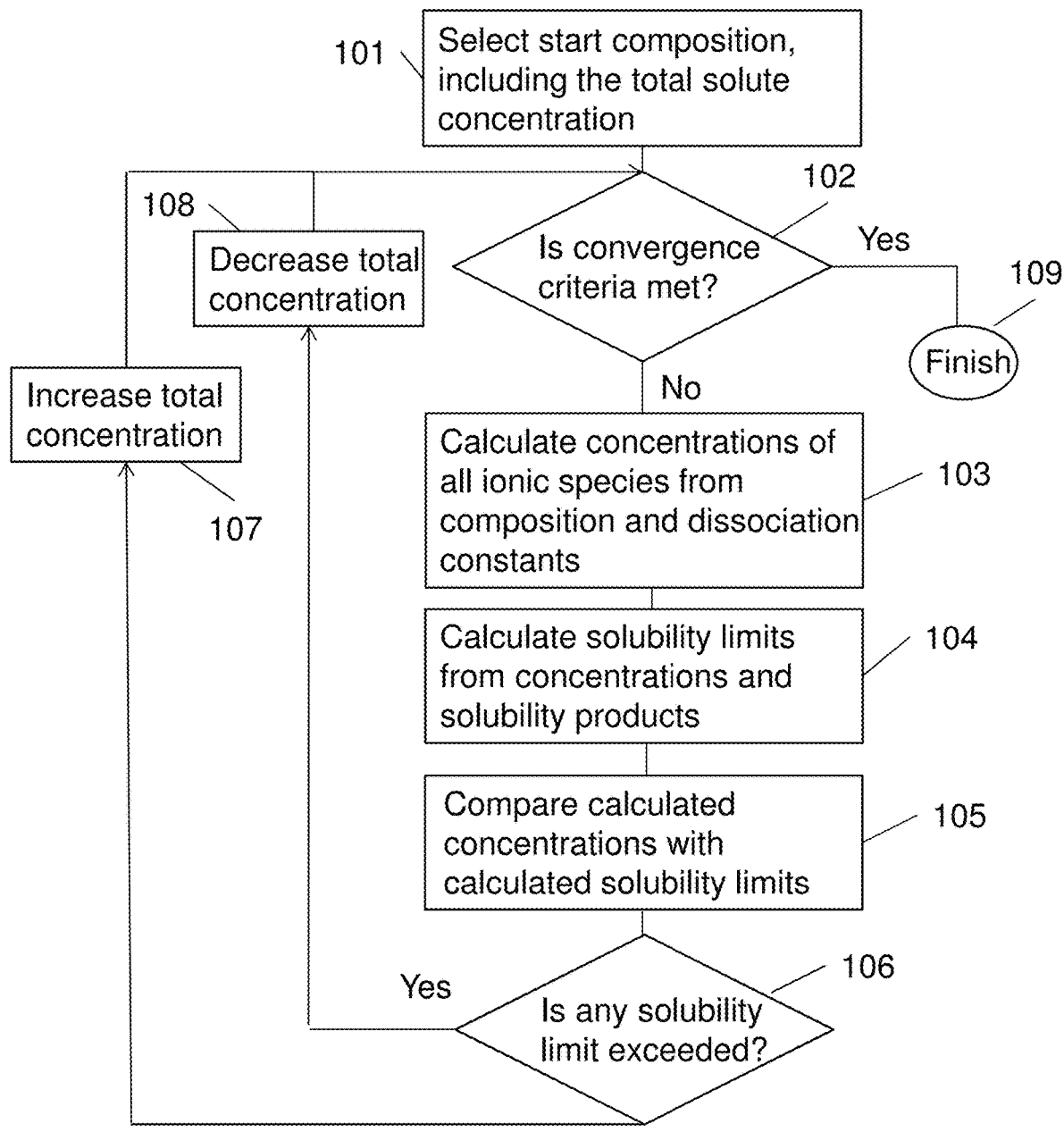

FIG. 7 is a flow diagram for the additional steps of determining the highest concentration limit.

Figure 8:
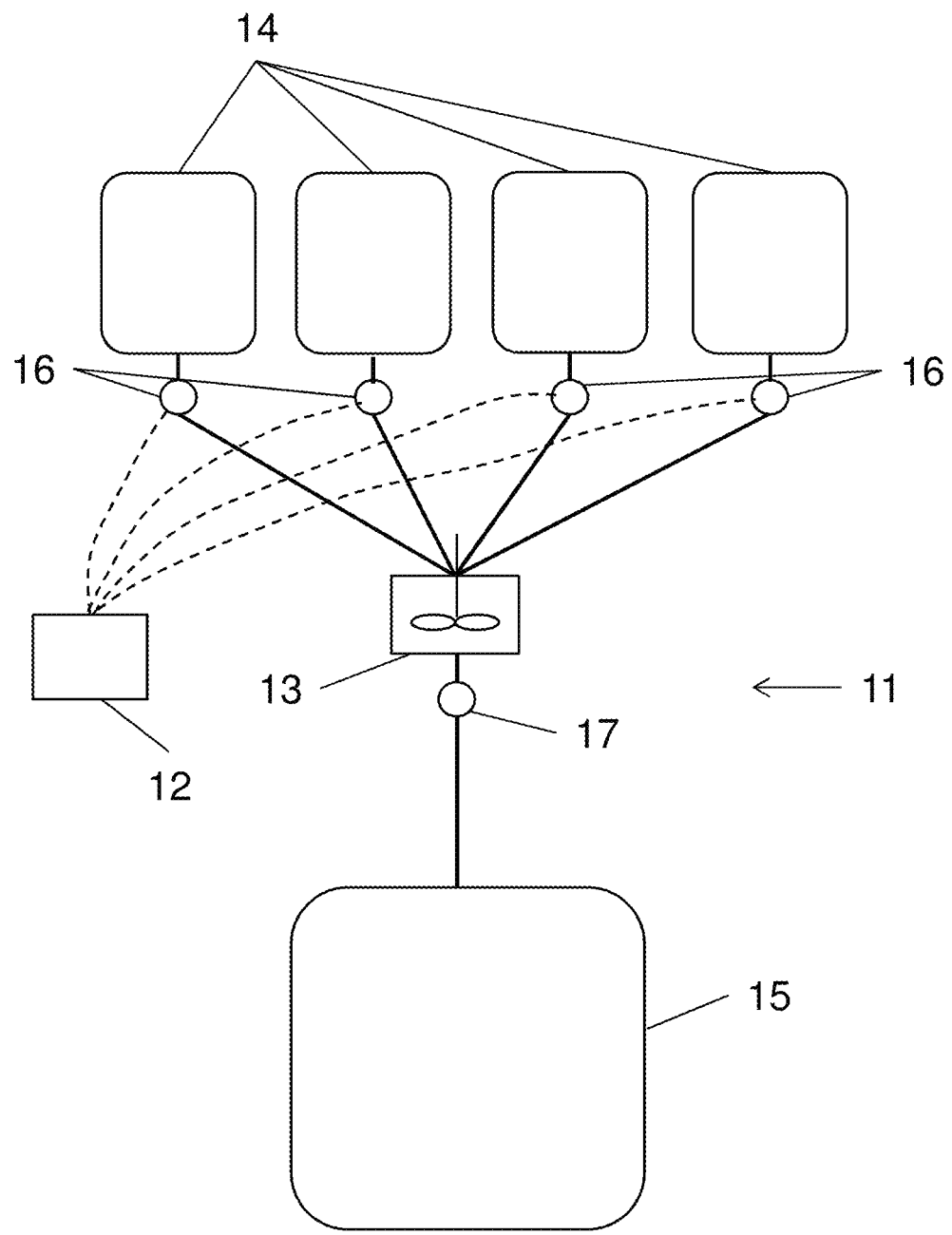

FIG. 8 shows a mixing system of the invention.

Figure 9:
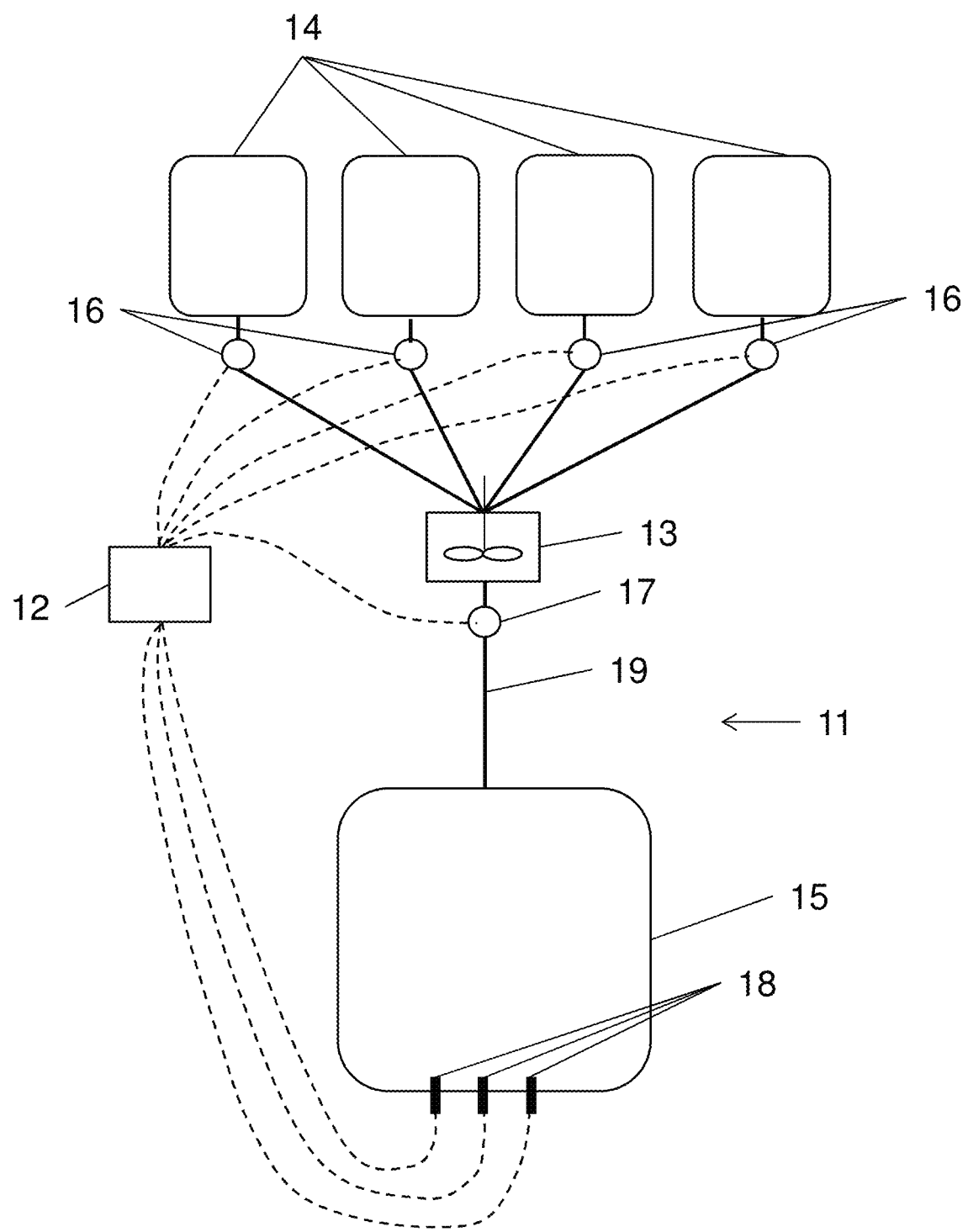

FIG. 9 shows a buffer formulation mixing system for use with the invention.

Figure 10:
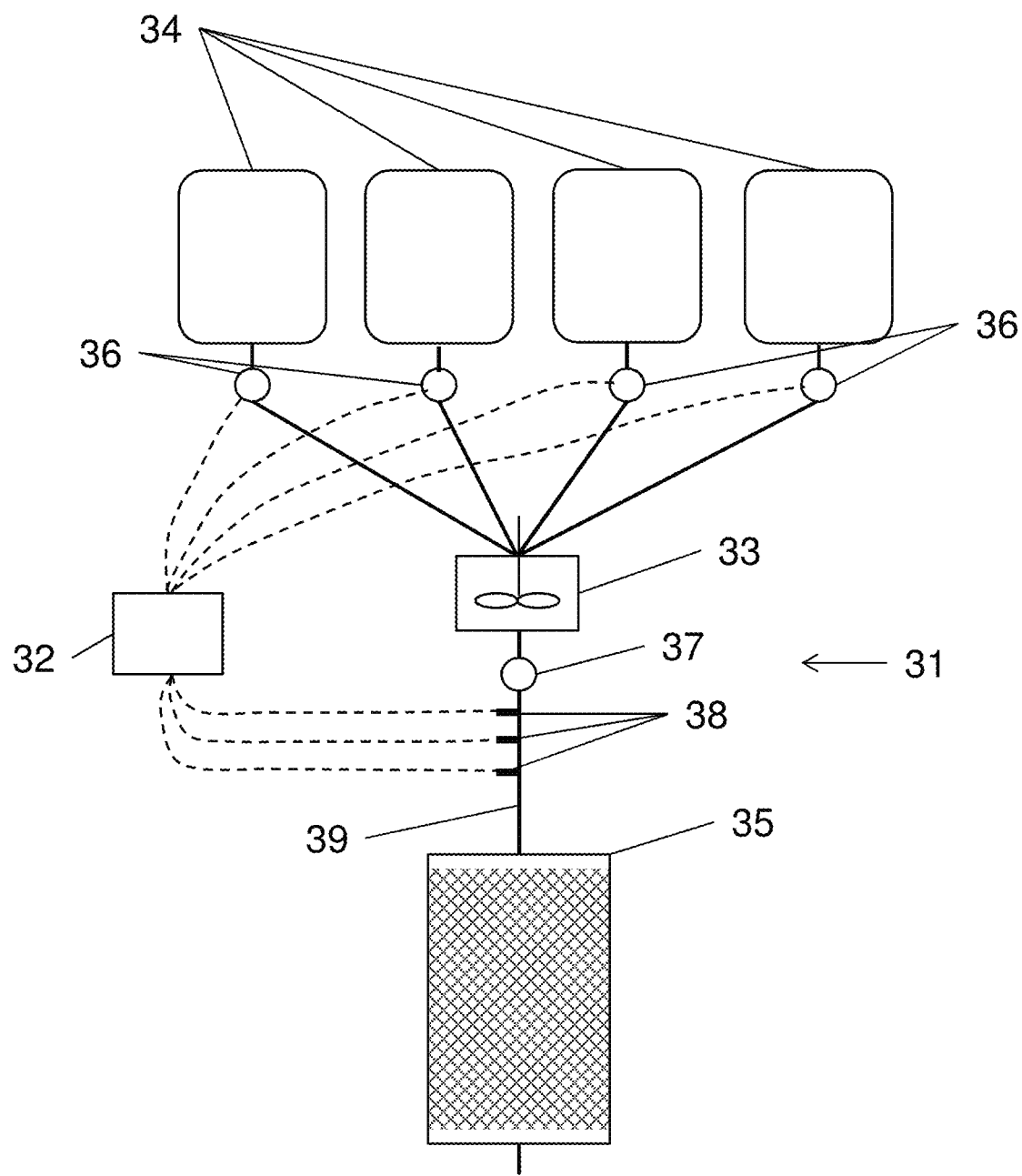

FIG. 10 shows an in-line conditioning mixing system for use with the invention.

DETAILED DESCRIPTION OF THE INVENTION

Unless defined otherwise, all technical and scientific terms used herein have the same meaning as commonly understood by a person skilled in the art related to this invention. Also, the singular forms "a", "an", and "the" are meant to include plural reference unless it is stated otherwise.

In order to facilitate an understanding of the disclosed invention, a number of terms will be defined below.

Definitions

Buffer

As used herein, a buffer solution is an aqueous solution comprising a mixture of a weak acid and its conjugate base or a weak base and its conjugate acid. It has the property that the pH of the solution changes very little when a small amount of strong acid or base is added to it. Buffer solutions are used as a means of keeping pH at a nearly constant value in a wide variety of chemical applications Titrand and Titrant As used herein in the context of buffer systems, a titrand is the solution (or other substance) into which a titrant is added. The titrand may, for example, be a weak acid or base, and the titrant a strong base or acid, respectively.

Electrolyte

A "strong" electrolyte is a solute that completely, or almost completely, ionizes or dissociates in a solution. These ions are good conductors of electric current in the solution. Examples of strong electrolytes include, for instance, salts, such as sodium chloride; strong acids, such as hydrochloric acid, sulfuric acid, nitric acid; and strong bases, such as potassium hydroxide, sodium hydroxide, calcium hydroxide.

A weak electrolyte, on the other hand, dissociates into ions only to a small extent, typically much less than 10%, and the vast bulk of the weak electrolyte remains in its original unionized form in solution. In general, most organic acids and their salts, and the salts of organic bases, are weak electrolytes. Examples of weak electrolytes include, for example acetic acid and citric acid and salts thereof. The amount of weak electrolyte that dissociates depends on the number of counter-ions present in the solution.

Conductivity (Electrolytic)

The conductivity (or specific conductance) of an electrolyte solution is a measure of its ability to conduct electricity. The SI unit of conductivity is "siemens" per meter (S/m).

Conductivity can be measured by conductometers well known in the art, typically at a temperature of 20° C. or at the temperature where the solution is to be used.

Ionic Strength

The ionic strength of a solution is a function of the concentration of all ions in the solution (half the sum of concentration multiplied by the square of ionic charge for all ions). The ionic strength is typically given in the unit mol/dm$^3$.

Solubility

The solubility of a species is the concentration of the species in a solution at equilibrium with the solid species. Normally this is the maximum concentration attainable in the solution before precipitation of the solid species occurs. The solubility of a buffer is the maximum total concentration of the solutes in the buffer attainable before precipitation of any solid species occurs.

Buffer Concentration

The buffer concentration herein means the sum of the concentrations of all weak acid and weak base species in the buffer.

Total Solute Concentration

The total solute concentration herein means the sum of the concentrations of all the dissolved species in the buffer.

Significant Ionic Species

The significant ionic species herein means all ionic species having a concentration of at least 0.1% of the total solute concentration.

Description of the Method of the Invention

To prepare a buffer having a desired pH, the added amounts of moles of titrand, titrant, and salt solution, when required, can be calculated. From these mole values, the volume needed from corresponding stock solutions can in turn be calculated. Typically, such calculations are performed by suitable computer software, which is commercially available. The use of such software permits the preparation of buffers up to concentrations of 1 M or higher, as will be described in more detail below.

According to the present invention there is now suggested a novel approach for predicting the error in the pH of a buffer as function of its pH value, buffer concentration and errors in the incoming components, wherein the total amount of counter ions as wells as the concentration of each subspecies has been obtained by solving the equilibrium equation, typically by using an algorithm taking into consideration the activity of the solution as described in more detail below.

With regard to the first step of determining the concentrations of the different ions present in solution, methods to do this are documented in the literature and well known to persons skilled in the art and will therefore be only briefly addressed below. Basically this includes solving the equilibrium equations for the buffering species.

Solving Equilibrium Equations

For a particular basic species (which may be a base B or a conjugate base A$^-$) in equilibrium with a corresponding acidic species (which may be a conjugate acid BH$^+$ or an acid HA, respectively) the following equation applies $$pH = pK_a + \log\{(\text{basic species})/(\text{acidic species})\} \quad (\text{Eq. 1})$$

which is often referred to as the Henderson-Hasselbach equation. In this equation, the parentheses denote the activity of each species rather than the concentration, the reason being that the ions involved tend to become shielded from the environment. The activity of each ion is related to the corresponding concentration through the activity coefficient φ

$$(\text{species}) = \varphi [\text{species}] \quad (\text{Eq. 2})$$

In the ideal state of infinite dilution, φ becomes 1 and the activity of every ion will be equal to the corresponding concentration. However, in practice, the ionic strength is different from zero and the activity coefficients of the different species will be less than 1.

Inserting Eq. 2 into Eq. 1 above gives the pH in terms of the concentrations instead of activities $$pH = pK_a' + \log\{(\text{basic species})/(\text{acidic species})\} \quad (\text{Eq. 3})$$

where $$pK_a' = pK_a + \log \varphi_b - \log \varphi_a \quad (\text{Eq. 4})$$

in which $\varphi_a$ and $\varphi_b$ are the activity coefficients for the acidic and basic species, respectively, and $pK_a'$ is an apparent $pK_a$ value which allows the use of the measureable concentrations of the different buffer species.

A model for these deviations is given in the so-called Debye-Hückel theory, known as $$\log \varphi = (AZ^2 I^{0.5})/(1 + 0.33 \ast 10^8 a I^{0.5}) \quad (\text{Eq. 5})$$

wherein A is a constant, or rather a temperature dependent parameter ~0.51. Using well known data, the value of A can accurately be calculated as $A = 0.4918 + 0.0007 \ast T + 0.000004 \ast T^2$, where T is the temperature in degrees Celsius, Z is the charge of the ion and the quantity a, the radii of the hydrated ions (in Å), is described as the "mean distance of approach of the ions, positive or negative" in the original paper of Debye and Hückel (P Debye, E Hückel: Physikalische Zeitschrift 24: 185-206, 1923).

The value of $pK_a'$ can be calculated by inserting Eq. 5 into Eq. 4 giving $$pK_a' = pK_a + (AZ_a^2 I^{0.5})/(1 + 0.33 \ast 10^8 a_a I^{0.5}) - (AZ_b^2 I^{0.5})/(1 + 0.33 \ast 10^8 a_b I^{0.5}) \quad (\text{Eq. 6})$$

where the subscripts a and b specify the parameters corresponding to the acid and the base respectively, $Z_a$=charge of acidic species, $Z_b$=charge of basic species, $a_a$=ion size parameter of the acidic species, and $a_b$=ion size parameter of the basic species.

As to the parameter a, Guggenheim E. A. & Schindler, T. D., (1934) *J. Phys. Chem.* 33. 533 suggests an approximation of the parameter a set to 3 Å for all buffer molecules, leading to the simplified formula $$pK_a' = pK_a + (AZ_a^2 I^{0.5})/(1 + I^{0.5}) - (AZ_b^2 I^{0.5})/(1 + I^{0.5}) \quad (\text{Eq. 7})$$

Eq. 7 above is the formula for ionic strength correction usually found in the literature.

Using Eq. 4 (or 1) in combination with the equations for (i) the conservation of mass, (ii) the conservation of charge, and (iii) the water dissociation equilibrium, the concentrations of the acidic and basic species, respectively, of a monoprotic buffer at equilibrium may be calculated.

However, many buffers are polyprotic, i.e. their buffer molecules can accept and give away more than one proton corresponding to more than one $pK_a$ value. The number of species in such a buffer system is always one more than the number of $pK_a$ values. The calculation of the amount of moles in each of the protonation species is equivalent to solving the equilibrium equations of each of the species with the "neighbouring" species with one more and/or one less proton and with the concentration of hydrogen atoms (the pH).

Assume, for example, a tritropic buffer. Four protonation states or species will be defined (s1, s2, s3 and s4), and three $pK_a$ values. Three equations (corresponding to three $pK_a$ values) may then be derived directly from Eq. 3 above.

$$xx[i] = 10^{(pH - pKa'[i])} \quad (\text{Eq. 8})$$

where each i corresponds to each $pK_a(i)$ value (i=1, 2, 3), and xx[i] are the ratios between the concentrations of the corresponding base and the corresponding acid i.e. $xx[1] = [s_2/s_1]$, $xx[2] = [s_3/s_2]$, $xx[3] = [s_4/s_3]$.

In addition to these three equations, an equation arises because of the conservation of mass $$[s_1] + [s_2] + [s_3] + [s_4] = \text{buffer concentration} \quad (\text{Eq. 9})$$

and the conservation of charge $$[H^+] - [OH^-] + \Sigma \text{ specific charge } (s_i) - \text{titrant\_charge} \ast [\text{titrant}] - \text{spec\_charge(start\_species)} \ast [\text{start\_species}] = 0 \quad (\text{Eq. 10})$$

By "start_species" is meant the species of the buffer substance before mixing, i.e. the protonation state of the buffer in the can or stock solution. This protonation state is determined by the amount of counter-ions per buffer molecule because the macroscopic object, can or stock solution, has to be electrically neutral. The minus sign in front of [OH⁻] is due to the minus sign of the charge of the OH ions, whereas the minus sign in front of the two last terms is due to the charge of the counter-ions of the titrant and the start_species, respectively.

Finally, there is the water dissociation equilibrium $$[OH^-][H^+] = 10^{14} \quad (\text{Eq. 11})$$

Equations (8) to (11) above imply that there are six equations with six unknowns (the four $[s_i]$, [OH⁻] and [H⁺]) for the case of three $pK_a$ values, and the equilibrium concentrations of the respective acidic and basic species may thus be calculated.

For a monoprotic buffer, for example, the calculations are simplified; $s_1$ corresponds to the acidic species, $s_2$ to the basic species and the concentrations of $s_3$ and $s_4$ are set to zero.

A more accurate determination of the ion size parameter a in the Debye-Hückel equation (Eq. 5) above is described in WO 2009/131524 A1 (the disclosure of which is incorporated by reference herein), where a is determined as the weighted mean ion size of all species contributing to the ionic strength of the liquid mixture, using the ionic strength as weighting parameter. The ion size parameter a may then be calculated as $$a = \frac{\sum I_i a_i}{I} \quad (\text{Eq. 12})$$

where $I_i$ is the ionic strength, $a_i$ is the ion size parameter of species i, and I is the total ionic strength defined by $$I = \tfrac{1}{2} \Sigma (C_i Z_i) \quad (\text{Eq. 13})$$

where $C_i$ is the concentration and $Z_i$ is the charge of ion present in the solution (in units of electronic charge), which gives $$I_i = \tfrac{1}{2} Z_i^2 C_i \quad (\text{Eq. 14})$$

The ion size parameter a may also be approximated as $$a = 0.5 \ast (\text{mass})^{1/3} + \text{shell} \quad (\text{Eq. 15})$$

where "shell" is fixed at a specific value for a positively charged ionic species (typically in the range of 3.9-4.1), and at another fixed value for a negatively charged species (typically in the range of 0-0.1, or 0).

This permits the determination of the relative proportions of the constituents of buffers having salt concentrations up to or above 2 M or even 5 M.

In the above-mentioned WO 2009/131524 A1 there is also disclosed a computer program, or software, for calculating a recipe (i.e. amounts of titrand, titrant, water and salt) to achieve a solution of a given pH and ionic strength (or, alternatively, salt concentration instead of ionic strength). Specifically, a computer program "Buffalo Plus" is disclosed which is written in Visual C++ and can be run in Windows for accurate calculation of buffer pH at ionic strengths as high as 1 M for buffer systems including phosphate, citrate, acetate and Tris.

Such software may conveniently be used for calculating the equilibrium concentrations of acidic and basic species for the purposes of the present invention.

Before describing the present invention in more detail, the way of thinking behind the "rules of thumb" named above to define the pH interval at which a buffer can be used and the theory behind the buffer capacity will be described.

Usually different types of "rules of thumb" are applied for instance +/−1.0 or 0.5 pH units from the thermodynamic $pK_a$ value. These rules of thumb are based on the fact that the best buffering condition occurs at pH=pKa (R J Beynon, J S Easterby: Buffer Solutions The Basics, IRL Press 1996 p. 18-34). However these rules of thumb are only gross approximations and do not take into consideration the buffer concentration whereas it is well known that the buffer concentration is very important factor determining the accuracy of a buffer. A better alternative is to use the calculated buffer capacity defined as the calculated number of moles of strong acid or base that give rise to a change in one pH unit per unit volume of solution as guidance to determine a valid pH interval. As described in the above-mentioned WO 2009/131524 the buffer capacity is defined as |dn/dpH|, where dn is the (small) change in amount (in moles) of strong acid/base giving rise to a (small) change dpH in pH. The value 0.01 (log−2.0) as a lower limit for the buffer capacity used in that reference was derived experimentally as it was observed that below this limit the root mean square error (RMSE) increased over 0.05 for most buffer systems. As a comparison the corresponding value used in the above discussed U.S. Pat. No. 6,221,250 was 0.0063 (log−2.2). No reference to a "normally accepted value" was found in the literature. These observations illustrate that it is not trivial to define a general level for the lowest limit of buffer capacity.

Figure 1:
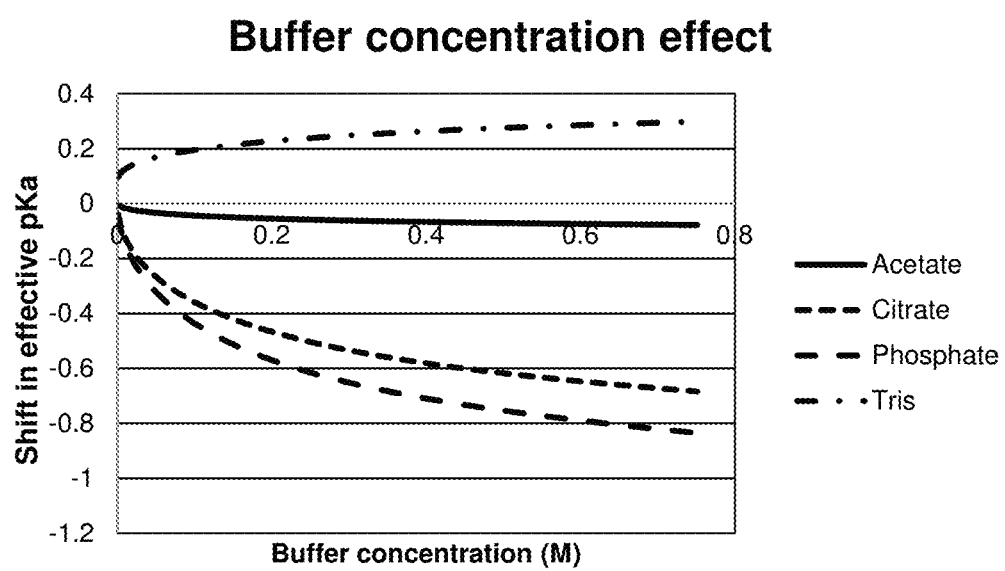
FIG. 1 shows a graphical view of shift in effective pKa at different buffer concentrations.
Figure 2:
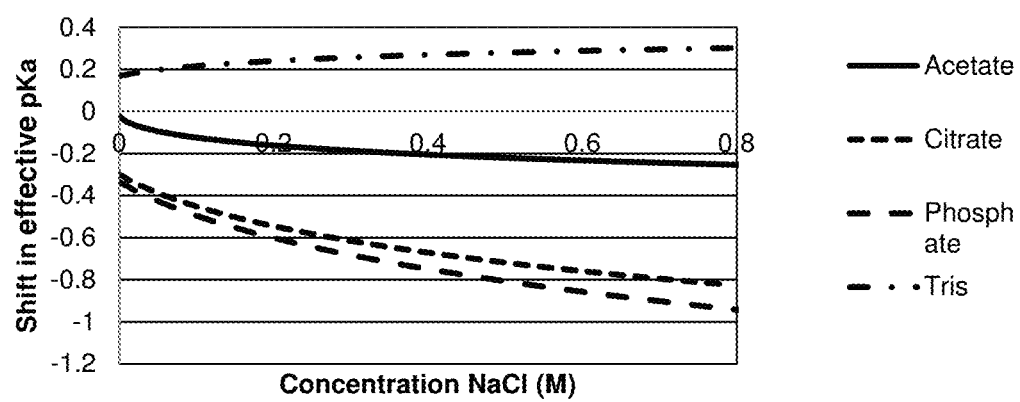
FIG. 2 is a graphical view of effective pKa at different sodium chloride concentrations in 50 mM buffers.

By using Buffalo Plus (described in the above-mentioned WO 2009/131524 A1), the change in pH when diluting a buffer was calculated. FIG. 1 and FIG. 2 show the relationship between changed concentrations in buffer concentration or salt concentration and shift in effective pKa, which is directly correlated to changes in pH.

Phosphate and citrate buffers show highest shifts in pH during changes in concentration while the other two buffers show slightly changes. Tris is the only buffer which shifts down, instead of up, when diluted. The reason is that in Tris the acid is charged while for the other buffers the base is the most charged. The formula that calculates the shifts is:

$$pKá = pKa + \log \phi_{base} - \log \phi_{acid} \quad \text{(Eq. 16)}$$

where $\phi$ is the activity coefficient. This results in a negative value for Tris buffer and a positive value for the rest.

The shifts in pKa were used for error calculations.

Predicting the Dynamic Range

Using this approach, in brief, by first determining the exact concentrations of the different ions present in solution including the concentration of each of the charged species of the buffer substance, the error in the pH can then be calculated.

According to the present invention, the prediction of the error in the pH of a buffer comprises a calculation of the total variance of the pH of the buffer as a sum of the variances of different components of the error. The error at one σ level is then calculated as the square root of the calculated total variance.

i) Solving the exact concentrations of the different ions present in the solution including the equilibrium concentration of each of the subspecies of the buffer or weak electrolyte for the specified pH value. This step has been described in detail above.

ii) Determining the contribution of each of the components of the buffer or weak electrolyte to the total variance by taking into consideration the pH value, the buffer concentration, the activity of ions in the solution and the accuracy of the incoming buffer components at different flow rates (e.g. the performance of the pumps providing the stock solutions).

This is done by analysing the input error. This will be explained in detail below for a specific pump type in an In-line condition system iii) Calculating the total variance and the total error at one sigma level of the formulated buffer as the square root of the variance.

$$\sigma = \sqrt{\sigma^2_{Pump\,water} + \sigma^2_{Base} + \sigma^2_{Acid} + \sigma^2_{Salt} + \sigma^2_{Formula} + \sigma^2_{pH\,meter} + \sigma^2_{pH\,meter}}$$

iv) Comparing the calculated error to a pre-defined error limit.

According to the present invention, illustrated by FIG. 6, the prediction of the error in the pH of a buffer to be prepared in a mixing system comprises a calculation of the total variance of the pH of the buffer as a sum of the variances of different components of the error. The error at one σ level can then be calculated as the square root of the calculated total variance. For every buffer considered the procedure implies the following steps:

i) Selecting a start composition of the buffer 1, giving start values for the pH and/or the buffer concentration and optionally selecting characteristics, such as flow rate error vs flow rate curves, for one or more pumps comprised in the mixing system to provide buffer components to the buffer. The start composition may include the amounts and/or concentrations of all components in the buffer.

ii) Solving the exact concentrations 3 of the significant ionic species present in the solution including the equilibrium concentration of each of the subspecies of the buffer or weak electrolyte for the specified pH value. The concentrations can be solved using the methods described above.

iii) Determining the contribution 4 of each of the components of the buffer or weak electrolyte to the total variance by taking into consideration the pH value, the buffer concentration, the activity of ions in the solution and the accuracy of the amounts of incoming buffer components at different flow rates (e.g. the performance of pumps providing the stock solutions).

iv) Calculating the total pH variance 5 and optionally the total error at one σ level of the formulated buffer as the square root of the variance.

v) Comparing the calculated error 6 to a pre-defined error limit.

In some embodiments, the prediction of the pH interval of a buffer at a given concentration for which the pH error is within a predefined limit comprises an iterative procedure where the pH of the buffer or weak electrolyte is varied 7,8 in steps starting from an arbitrary start value. The size of the step is varied during the procedure being larger at the beginning and smaller at the end. For every pH value the procedure implies the steps i) to v) described above. Upon the results of the comparison it is decided 6 whether to increase or decrease the pH in the next step. When a predetermined convergence criteria is met 2, the process is finished 9. An alternative procedure is to do the calculations for all pH values differing by a pre-defined distance in a pH interval. The pH interval of the buffer at which the error is within a predefined limit is then obtained as the set of pH values for which the pH error is lower than the predefined value.

In certain embodiments, the prediction of the lower concentration interval of a buffer at a given pH value for which the error is within a predefined limit comprises an iterative procedure where the concentration of the buffer or weak electrolyte is varied 7,8 in steps starting from an arbitrary start value. The size of the step is varied during the procedure being larger at the beginning and smaller at the end. For every concentration value the procedure implies the steps i) to iv) described above. Upon the results of the comparison it is decided 6 whether to increase or decrease the concentration in the next step. If the calculated error is larger than the threshold the concentration is increased. If the calculated error is smaller than the threshold the concentration is decreased. When a predetermined convergence criteria is met 2, the process is finished 9. An alternative procedure is to do the calculations for all concentration values differing by a pre-defined distance in a concentration interval. The lower concentration limit of the buffer at which the error is within a predefined limit is then obtained as the lowest concentration at which the error is lower than the predefined value.

In certain embodiments, the method can be used for pH error predictions in a system where liquid buffer components (e.g. stock solutions) are conveyed by pumps, e.g. metering pumps and mixed to obtain the buffer. The metering pumps can be of different types, e.g. diaphragm pumps, piston pumps or peristaltic pumps, all of which are well known in the art. Metering pumps are constructed to deliver a liquid flow of high accuracy, but the flow rate will always be associated with an error, which can be expressed as a variance or standard deviation of the flow rate. The relative error, e.g. the variation coefficient, will for a given pump vary with the flow rate, such that the relative error increases with decreasing flow rate. As the increase is steeper at low flow rates, it is common to set a minimum flow rate, below which the pump is not considered as accurate. This means however that depending on the acceptable error in a given application, the pump may still be usable below the minimum flow rate. To allow a better utilisation of a pump, it can be better to determine the flow rate error for the pump as a function of the flow rate and to fit a suitable equation to the curve obtained. Many pumps have relative errors $\sigma_{pump}$/flow rate which are inversely proportional to the flow rate, e.g. according to Eq. 16, where $k_1$ and $k_2$ are pump-specific constants.

$$\sigma_{pump}/\text{flow rate} = k_1 + k_2/\text{flow rate} \quad \text{(Eq. 16)}$$

Hence, in the determination of the pH error, the variances in the amounts of incoming buffer components can be calculated from the pump flow rates using predetermined error vs. flow rate functions. Optionally, the contribution to the pH variance from each of the variances in amounts of buffer components can be calculated as the variance in amount of each buffer component divided by a calculated buffer capacity, e.g. defined as $|dn/dpH|$ as discussed above.

To obtain the highest concentration limit (i.e. the highest concentration before precipitation occurs) the method described in copending application SE 1451148-9 (which is hereby incorporated by reference in its entirety) can be applied. The concentration interval with predicted error lower than the pre-specified limit or dynamic range of the buffer is the interval between the lowest concentration limit obtained as described above and the highest concentration limit obtained as described below and in further detail in copending application SE 1451148-9.

The determination of the highest concentration limit can, as illustrated by FIG. 7, be made using the following steps:

a) selecting a start composition of the buffer 101, giving a start value for the total solute concentration. The start composition may include the amounts and/or concentrations of all components in the buffer;

b) calculating the concentrations of all significant ionic species present in the buffer at the specified pH value (and optionally temperature) 103 from the total composition (including the buffer volume and the amounts of all buffer components) of the buffer and available dissociation constants;

c) calculating the solubility limits of each combination of significant ionic species present in the buffer 104 from available solubility products, taking the concentrations calculated in step a) into account;

d) comparing the concentrations of all significant ionic species calculated in step a) with the solubility limits calculated in step b) 105 and determining 106 if any solubility limit is exceeded;

e) if no solubility limit is exceeded, increasing 107 the total solute concentration of the buffer or, if at least one solubility limit is exceeded, decreasing 108 the total solute concentration of the buffer, and;

f) repeating steps b)-e) until a predetermined convergence criteria 102 is met 109. In step e), the amount of concentration increase/decrease may be a predetermined constant amount, but it may also be a dynamic function, e.g. starting with a predetermined amount and diminishing the increase/decrease amounts according to a predetermined pattern as the convergence criteria is approached.

The concentration of each significant ionic species in step b) is suitably calculated by an algorithm comprising the equation of Debye-Hückel, wherein the ionic strength of each species is used as a weighting parameter in the calculation of an average hydrated radius of the ionic species, as will be described in more detail below.

The above-described method may advantageously be used for controlling a buffer formulation system or an in-line conditioning system. The method may also be used in screening experiments wherein buffer concentration and/or pH is/are used as (a) design of experiment (DoE) parameter(s). The buffer concentration interval and/or the pH interval obtained by this method give(s) the maximum buffer concentration and minimum buffer concentration and the maximum and minimum pH value for such a design.

Other preferred embodiments are set forth in the dependent claims.

In another aspect, the present invention provides a computer program product comprising instructions for performing the steps of the method aspect above.

According to some embodiments of the present invention, the prediction of the pH interval of a buffer at a given concentration for which the error is within a predefined limit comprises an iterative procedure where the pH of the buffer or weak electrolyte is varied in steps starting from an arbitrary start value. The size of the step is varied during the procedure being larger at the beginning and smaller at the end. For every pH value the procedure implies the steps i) to iv) described above. Upon the results of the comparison it is decided whether to increase or decrease the pH in the next step. An alternative procedure is to do the calculations for all pH values differing by a pre-defined distance in a pH interval. The pH interval of the buffer at which the error is within a predefined limit is then obtained as the set of pH values for which the pH error is lower than the predefined value.

According to a second embodiment of the present invention, the prediction of the lower concentration interval of a buffer at a given pH value for which the error is within a predefined limit comprises an iterative procedure where the concentration of the buffer or weak electrolyte is varied in steps starting from an arbitrary start value. The size of the step is varied during the procedure being larger at the beginning and smaller at the end. For every concentration value the procedure implies the steps i) to iv) described above. Upon the results of the comparison it is decided whether to increase or decrease the pH in the next step. If the calculated error is larger than the threshold the concentration is increased. If the calculated error is smaller than the threshold the concentration is decreased. An alternative procedure is to do the calculations for all concentration values differing by a pre-defined distance in a concentration interval. The lower concentration limit of the buffer at which the error is within a predefined limit is then obtained as the lowest concentration at which the error is lower than the predefined value. To obtain the highest concentration limit the method described in copending application SE 1451148-9 is applied, i.e. a) selecting a start composition of the buffer, giving a start value for the total solute concentration;
b) calculating the concentrations of all significant ionic species present in the buffer from the total composition of the buffer and available dissociation constants;
c) calculating the solubility limits of each combination of significant ionic species present in the buffer from available solubility products, taking the concentrations calculated in step a) into account;
d) comparing the concentrations of all significant ionic species calculated in step a) with the solubility limits calculated in step b) and determining if any solubility limit is exceeded;
e) if no solubility limit is exceeded, increasing the total solute concentration of the buffer or, if at least one solubility limit is exceeded, decreasing the total solute concentration of the buffer, and;
f) repeating steps b)-e) until a predetermined convergence criteria is met.

The pH interval with predicted error lower than the pre-specified limit or dynamic range of the buffer is the interval between the lowest concentration limit obtained as described above and the highest concentration limit obtained as described above and in copending application SE 1451148-9.

In some embodiments, the method is adapted for use with an In-Line Conditioning (IC) system or other mixing systems involving continuous preparation or modification of buffers by continuous mixing of buffer components from e.g. storage tanks and/or previous unit operations. IC systems involve continuous mixing of a buffer or a biomolecule solution, e.g. derived from a previous chromatography or cell cultivation step, with one or more conditioning solutions which can include pH-adjusting solutions and/or conductivity-adjusting solutions (e.g. salt solutions). Common to continuous mixing is that one or more solutions are delivered by pumping, typically involving metering pumps. As discussed above, the variance contribution from the pumps will then have to be taken into account. In order to increase the accuracy, pumps may also be supplemented by flow meters in the exit lines from the pumps, coupled with feedback loops for fine regulation of the flow rate. However, there will still be a variance contribution from the pump-flow meter assembly, which will have to be taken into account in the calculations.

In continuous mixing, pulsation caused by pumps can produce intermittent variance contributions, which will show up as periodic pH fluctuations. If the mixing system contains either any form of surge tank, air bubble trap or other device with a significant hold-up volume or a mixing device such as a static mixer, such fluctuations may level out. In this case, the variance contribution from the pumps may be taken as a lower value, e.g. by dividing with a predetermined empirical reduction factor.

In one aspect, illustrated by FIGS. 8-10, the present invention discloses a mixing system 11;31 configured to carry out the methods described above. The mixing system comprises a control unit 12;32, a mixer 13;33 and at least two component tanks 14;34, fluidically connected to the mixer. The control unit can suitably be a computer, programmed to perform the solubility prediction as described above. The component tanks can contain stock solutions of buffer components, which are then mixed by the mixer in proportions controlled by the control unit and either conveyed into a storage tank 15 (for a buffer formulation system) or directly into e.g. a chromatography column 35, a chromatography system or other equipment for use in a separation process (e.g. for an in-line conditioning system), which are fluidically connected to the mixer. The stock solutions can e.g. be conveyed to the mixer by component pumps 16;36, which can suitably be metering pumps, such as piston pumps, diaphragm pumps or peristaltic pumps. The component pumps are suitably electrically or electromagnetically coupled to the control unit and controlled by the control unit to provide a buffer composition calculated by the methods described above, e.g. such that the predicted pH error is within a predetermined range and optionally that the total solute concentration is e.g. 60-99, such as 80-99 or 90-99% of the calculated solubility limit. The mixer can be a passive mixer (i.e. a mixer without moving parts), such as a static mixer, or it can be a mixer with moving parts, e.g. an impeller-driven mixer. From the mixer, the mixed buffer is conveyed to the storage tank or to further equipment such as a chromatography system, either by a buffer pump 17;37 or by gravity flow. The buffer pump may also be electrically or electromagnetically coupled to the control unit and controlled by the control unit.

The mixing system may also be equipped with one or more sensors 18;38, e.g. pH, conductivity, temperature and/or precipitation sensors. Such sensors may e.g. be located in the storage tank 15 or in a conduit 19;39 downstream from the mixer and can be used to monitor and document the actual composition and/or properties of the buffer. They can suitably be electrically or electromagnetically connected to the control unit and their signals may optionally be used in additional feedback loop control of the component pumps 16;36, e.g. for fine adjustment of the buffer composition. pH, conductivity and temperature sensors are well known in the art and the precipitation sensor can e.g. be an optical turbidity sensor or other type of sensor suitable for detecting particles in a liquid.

The invention will now be described in more detail, by way of example only, by the following non-limiting Examples.

Example 1. The Calculation of the pH Error from the Error in the Components

The pump and flow loop error for IC was calculated on different phosphate buffers by first using BuffaloPlus to receive the relationship, in percent, between stock solutions at a specific pH, temperature and concentration. From those amounts the flow rates for the different pumps; acid, base, water and salt were calculated. The flow rates in turn could be used in an error formula received from the pump manufacturer (Eq. 17).

Pump and Flow Loop Error Equation from Manufacturer:

$$+/-((0.25+(0.1/\text{flow rate}))*100)\% \quad (\text{Eq. 17})$$

Verifications of the theoretical pump error were done by setting up an experiment in the In-line Conditioning (IC) system. A small scale preparation of stock solutions in lab was first made to calculate the weight of water needed for a specific concentration. This value was then used to calculate the amount of water and chemicals required in large scale experiments. In this way, a more accurate concentration of the stock solutions in large scale could be calculated. The experimental setup included six conditions with varying buffer concentration and pH (Table 1). The experiment was made for stock solutions with 60% of maximum solubility.

TABLE 1

Experimental setup for pump and flow loop error test. Phosphate buffer

| pH | Concentration (mM) |
|---|---|
| 6.0 | 10 |
| 7.0 | 10 |
| 8.0 | 10 |
| 6.0 | 100 |
| 7.0 | 100 |
| 8.0 | 100 |

Figure 3:
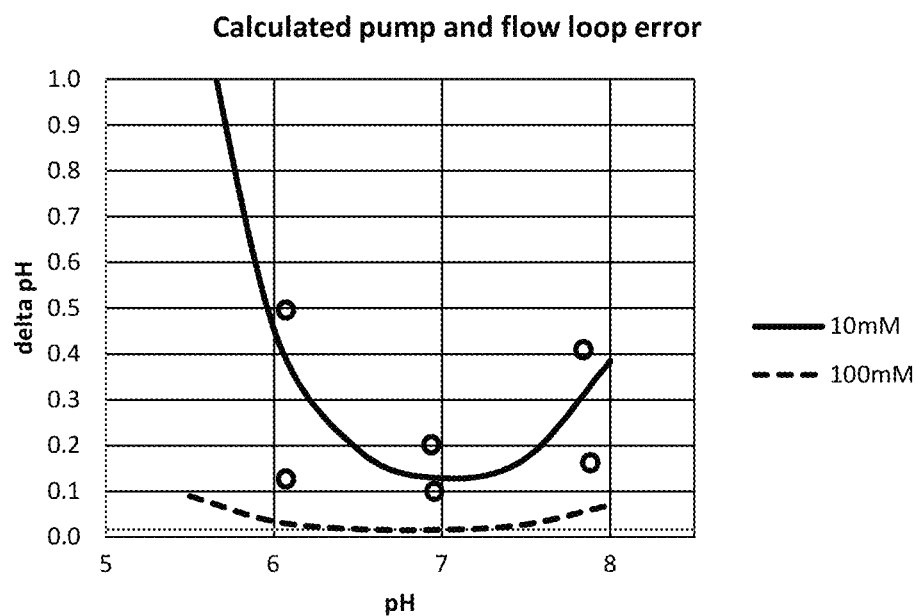
FIG. 3 shows theoretical calculations for pump and flow loop error analysis calculated on 400 L/h flow.

These experiments were chosen to verify errors both during low pump flows (below 4 L/h, the limit of the pumps flow specifications) and errors during higher pump flows. Theoretical calculations for expected errors were done by using Eq. 17 and by taking buffer capacity into consideration (FIG. 3).

The pump and flow loop error experiment was run twice, once with a total flow of 400 L/h and once with a total flow of 600 L/h. The experimental data was then compared to calculated values.

Results from an experiment made to verify the pump and flow loop error formula from a pump manufacturer can be seen in FIG. 4.

Large errors could be seen at pH 6, 10 mM buffer at both flow rates. In general 10 mM buffers gave larger fluctuations than 100 mM buffers which were expected due to lower buffer capacity and because a lower buffer concentration leads to lower flow from both acid and base pump. Phosphate buffer has effective pKa value around 7, which also can be seen. Stable values for both 10 mM buffers and 100 mM buffers can be seen at pH 7. When doing the experiment with 600 L/h flow and 100 mM buffer at pH 8, a huge dip in pH could be seen. No change in flow rate, conductivity or pressure could be seen though. Theoretical calculations for the example with 400 L/h flow were done (FIG. 4). The experimental fluctuations in pH are greatest at pH 6, 10 mM buffer as expected from theoretical calculations but the exact values differed.

The pump and flow loop formula from manufacturer (Eq. 17) were modified to fit the experimental values. A new, more suitable formula was developed (Eq. 18).

New Pump and Flow Loop Error Equation from Experimental Data:

$$+/-(((0.1/\text{flow rate})/2.13)*100)\% \quad (\text{Eq. 18})$$

The error corresponds to one σ-level.

The theoretical relative errors plotted in FIG. 5 are from the new equation (Eq. 18) before dividing with 2.13. A relationship between theoretical and experimental values can be seen.

Example 2. Error Analysis—MAb Buffer

TABLE 2

Error analysis with ID and IC for first step in MAb example.

| Error analysis | ID | IC-recipe and flow feedback | IC-pH feedback |
|---|---|---|---|
| Sodium phosphate, 20 mM, 50 mM NaCl, pH 7.2 | 0.037 (1 σ) | 0.043 (1 σ) | 0.03 (1 σ) |

The error analysis for the MAb example is based on the error analysis below:

Calculations, Error in ID for Sodium Phosphate, 20 mM, 50 mM NaCl, pH 7.2:

$$\sigma = \sqrt{\sigma^2_{Water} + \sigma^2_{Conc.buffer} + \sigma^2_{Pump\,water} + \sigma^2_{Base} + \sigma^2_{Acid} + \sigma^2_{Salt} + \sigma^2_{Formula} + \sigma^2_{pH\,meter} + \sigma^2_{pH\,meter}}$$

Ex:

Water=($d$pKa/$d$C+$d$pKa/$d$Salt)*buff.conc*accuracy of the glass ware=(−5.12+−1.9)*0.02*0.0067=−0.001

Conc buffer=(0.1/(2.13*flow))*Conc*($d$pKa/$d$Salt+ $d$pKa/$d$Conc)=(0.1/(2.13*58.8))*0.02*(−5.12+− 1.9)=−0.0001

Pump water=(0.1/(2.13*flow))*Conc*($d$pKa/$d$Salt+ $d$pKa/$d$Conc)=(0.1/(2.13*541.2))*0.02*(−5.12+− 1.9)=−0.00001

Base=analysis scale*(moles/buff.cap)=0.001* (0.013898/0.009865)=0.0014

Acid=0.0006

Salt=analysis scale*salt conc.*($d$pKa/$d$Salt)= 0.001*0.05*−1.9=−0.0001

Formula=0.03 pH meter=0.02 & 0.005

$$\sqrt{\begin{array}{l}(-0,001)^2+(-0,0001)^2+(-0,00001)^2+\\0,0014^2+0,0006^2+\\(-0,0001)^2+0,03^2+0,02^2+0,005^2\end{array}}=0.036\,(1\sigma)$$

Calculations, Error in IC with Recipe Ruled Flow Feedback for Sodium Phosphate, 20 mM, 50 mM NaCl, pH 7.2 [15]:

$$\sigma=\sqrt{\begin{array}{l}\sigma^2_{Pump\,water}+\sigma^2_{Base}+\sigma^2_{Acid}+\sigma^2_{Salt}+\\\sigma^2_{Formula}+\sigma^2_{pH\,meter}+\sigma^2_{pH\,meter}\end{array}}$$

Pump water=(0.1/(2.13*flow))*($d$pKa/$d$Salt+$d$pKa/$d$Conc)=(0.1/(2.13*554.1))*(5.12+−1.9)=−0.0006

Base=(moles/buff.cap)*√(analysis scale2+VolumeWater2+PumpError2)=(0.013898/0.009865)*√(0.0012+0.00672+(0.1/(25.7*2.13)))=0.01

Acid=0.007 (With flow rate 5.2)

Salt=$d$pKa/$d$Salt*SaltConc*√(analysis scale2+VolumeWater2+PumpError2)=−1.9*0.05*√(0.0012+0.00672+(0.1/(15*2.13))2)=−0.0007

Formula=0.03 pH meter=0.02 & 0.005

$$\sqrt{\begin{array}{l}(-0.0006)^2+0,01^2+0,007^2+\\(-0,0007)^2+0,03^2+0,02^2+0,005^2\end{array}}=0.038\,(1\sigma)$$

While the above described procedure was done manually, it may conveniently be performed by an algorithm designed therefor. Based on the teaching above, the design of such a suitable algorithm may readily be made by a person skilled in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties as if individually incorporated.

The invention claimed is:

1. A method for predicting a pH error during mixing in a mixing system of an aqueous buffer comprising at least one weak acid species or at least one weak base species, said method comprising the steps of:

a) selecting a start composition of the buffer comprising amounts or concentrations for all buffer components, giving start values for pH and/or buffer concentration and selecting characteristics for one or more pumps comprised in said mixing system to provide buffer components to the buffer;
   b) calculating the concentrations of all selected significant ionic species present in the buffer at a specified pH value from the total composition of the buffer and known dissociation constants of the selected significant ionic species, wherein the concentrations of the selected significant ionic species are calculated using the equation of Debye-Hückel, wherein the ionic strength of all species is used as a weighting parameter in the calculation of an average hydrated radius of the selected significant ionic species;
   c) calculating the contribution of each of said selected significant ionic species to a total pH variance from the specified pH value, the buffer concentration, the calculated concentrations of the selected significant ionic species and variances in amounts of buffer components, wherein the variances in amounts of buffer components are calculated from predetermined error vs. flow rate functions for said one or more pumps and wherein the contribution to the pH variance from each of the variances in amounts of buffer components is calculated as the variance in amount of each buffer component divided by a calculated buffer capacity;
   d) calculating the pH variance by dividing the variances in amounts of buffer components by a predetermined empirical factor for any surge tank, air bubble trap or static mixer comprised in said mixing system;
   e) setting the pH variance or the square root of the pH variance as the pH error
   f) comparing the calculated pH error with a predetermined error limit;
   g) changing the buffer concentration according to a predetermined function and repeating steps b)-g) until a predetermined convergence criteria is met, and calculating the concentrations of all selected significant ionic species present in the buffer from the total composition of the buffer and available dissociation constants;
   h) calculating the solubility limits of each combination of selected significant ionic species present in the buffer from available solubility products, taking the concentrations calculated in step g) into account;
   i) comparing the concentrations of all selected significant ionic species calculated in step a) with the solubility limits calculated in step h) and determining if any solubility limit is exceeded;
   j) if no solubility limit is exceeded, increasing the total solute concentration of the buffer or, if at least one solubility limit is exceeded, decreasing the total solute concentration of the buffer, and;
   k) repeating steps g)-j) until a predetermined convergence criteria is met.

2. The method of claim 1, which is computer-implemented.

3. The method of claim 2, further comprising a step l) of preparing said buffer at a total solute concentration corresponding to 60-99, 80-99 or 90-99% of a predicted solubility.

4. The method of claim 3, further comprising a step m) of using the buffer prepared in step l) as a stock solution for preparation of a working buffer by dilution of said stock solution.

* * * * *